Patented June 24, 1930

1,766,932

UNITED STATES PATENT OFFICE

IZADOR J. NOVAK, OF BRIDGEPORT, CONNECTICUT, ASSIGNOR, BY MESNE ASSIGNMENTS, TO RAYBESTOS-MANHATTAN, INC., A CORPORATION OF NEW JERSEY

HARDENED CELLULAR OR FIBROUS FRICTION ELEMENTS AND METHOD OF PRODUCING SAME

No Drawing.   Application filed June 9, 1926.   Serial No. 114,849.

This invention relates to improvements in hardened cellular or fibrous friction elements and methods of producing same, and more especially friction elements with a base of woven or unwoven stock, in which the binding substance comprises an infusible phenolic condensation product and a modifying substance.

I am aware that it has previously been proposed to utilize phenolic condensation products in friction elements, see Frood British Patent No. 121,301, which employs an infusible phenol resin as the sole binder, and Fisher, U. S. Patent No. 1,436,158, who utilizes a mixture of phenol resin and sufficient rosin to augment the frictional properties of the phenol resin. These are essentially the only two types of binder intended for friction elements comprising phenol resin which have come to my notice, but both have serious drawbacks for this use.

The hardening phenol resins used by both Frood and Fisher and defined by the condensing agents used, have been found to display marked tendencies to form a hard permanent glaze under frictional abuse, the frictional coefficient frequently falling to as low as .09 for an asbestos body containing only an infusible type phenol resin as binder. Friction elements with such a minimum coefficient would not be satisfactory in the present design of clutches and brakes which are intended to operate efficiently at a frictional coefficient between .2 and .35. Fisher seeks to improve upon the Frood binder by adding a friction-augmenting substance and as a practical method of carrying out his process describes a combination of phenol resin and rosin. He thereby obtains an increase in the frictional properties of the binder, but in so doing and in proportion to the amount of rosin added (up to 50% of the mixture as determined by the applicant for optimum frictional qualities) he transforms his combination into a fusible soluble resin which has no longer the strong, hard, heat resisting properties of an infusible phenolic resin. Berend U. S. Patent No. 1,191,390 describes this combination of gum and phenolic resin in a method of producing fusible soluble resins. In short, Frood has a strong, hard infusible resin which shows low frictional qualities, while Fisher obtains good frictional qualities at the expense of the strength and heat resisting properties of his resin mixture.

In carrying out my invention, I utilize as a binder a homogeneous stable solution of a phenolic resin in a suitable modifying carrier hereinafter described. The binder may be impregnated into a suitable asbestos base either of the woven or unwoven type, or mixed with the fibrous materials comprising the base previously to forming. The saturated formed element may be then subjected to heat and oxidation, or to heat without oxidation until the desired hardness and toughness has been attained through setting of the phenolic resin to a substantially infusible state with or without hardening of the modifying substance.

The treatment used may be varied so as to bring out the desirable qualities conferred by the particular modifier being used: for instance, china wood oil may be heat-treated so as to oxidize or polymerize it, the two processes conferring different qualities on the resultant product; or a non-drying oil may be destructively distilled, oxidized, or allowed to remain in its original form to utilize its softening properties on the resultant substantially infusible phenolic resin. The use of the combination of phenolic resin and modifier treated according to the present invention permits of the production of modified resin binders having a large range of frictional and strength characteristics from which suitable products may be chosen to suit the needs of the friction element industry.

The following illustration of one method for making unwoven clutch facings, may be given: Annular ring blanks of the approximate desired dimensions may be die-cut from asbestos millboard and may be allowed to saturate (preferably under pressure) to an increase in weight of 50% in a saturant composed of equal parts of a smooth solution of cresylic acid—formaldehyde resin and china wood oil. After saturation, the rings are allowed to hang vertically until the surface is free of excess saturant. They may be then dried in an oven at say 150°–175° F. more or less, for a period of say, 4 hours more or less, to partially oxidize and harden the surfaces so that they will not adhere in the subsequent operation. The rings may be then stacked face to face and held together in a pack by suitable means, for instance, a set of steel plates and a bolt running therethrough, and subjected to a temperature of say 350° F. more or less, for say 6 hours more or less, followed by say 400° F. more or less for say 4 hours more or less.

During this period the phenolic resin-china wood oil binder has hardened due to the setting of the resin and the polymerization of the china wood oil, and the rings when removed from the pack are hard and strong. The rings may be then sanded to remove the surfaces, which always contain an excess of saturant and may be then returned to the ovens for a further cure of say 4 hours more or less, at say 350° F. more or less. This last cure serves the specific purpose of increasing the frictional qualities of the resultant clutch facings. The rings removed from the pack may show a low minimum friction after sanding, whereas after the final cure the minimum friction is much augmented.

By another variation of the above described method, I may proceed as follows: The saturated blanks (linseed oil may replace china wood oil here) may be hung in an oven on racks and heated at say 250° F. more or less, for say 4 hours more or less, and at say 350° F. more or less for say 10 hours more or less, during which time the hardening of the binder due to the setting of the resin and the oxidation of the oil takes place progressively without any distortion or blistering of ring surfaces, which might be expected considering that we are subjecting a phenolic resin of the infusible type to high temperature without any application of pressure to confine the evolved gases. After the rings are sufficiently hard, they may be removed from the ovens, cooled under pressure to maintain flatness, and sanded to size. No friction augmenting cure is necessary in this case. The hardness is of the same order as that of the rings cured in a pack.

For woven clutch facings, I preferably vary the saturant so as to decrease the concentration of the binder, since this type of facing is usually desired flexible and resilient. The following may be an example of a suitable saturant:

| | Parts |
|---|---|
| Boiled linseed oil | 80 |
| Phenolic resin | 20 |
| Benzol | 200 |

The woven asbestos covered wire tape is saturated in the above to say 40% increase over the raw weight, the solvent is dried out at a low temperature, say 180° F. more or less, or allowed to air dry, and the stock is wound on a suitable mandrel into a close packed spiral. The mandrel and spiral may be then subjected to a temperature of say 300° F. more or less, for say 5 hours more or less, the spiral removed from the mandrel and cured further for say 1 hour more or less, at say 300° F. more or less. The rings may be then cut from the spiral, laced and pressed. The surfaces may be ground if such a finish is desired.

Clutch facings made by the first two methods above are eminently suited for the cutting of gear teeth in their outer or inner circumferences where it is desired that the friction element shall act as its own driving member. The quality of machineability is very marked in these products due to the excellent cohesion and uniform toughness of material made in the manner described. Also, I find it perfectly practical to cure thicknesses of as great as one inch thoroughly and uniformly, without the case hardened effect noticeable in treatments previously used for friction elements, where the hardening depends on oxidation or destructive distillation from the surface inwards.

Another feature of this invention resides in the high durability combined with frictional efficiency of the resultant elements as compared with previous commercial products. Where I may utilize a combination of drying oil and phenolic resin for these processes, I obtain the toughening effect of the drying oil modified by the strength and cohesiveness so characteristic of the infusible type of phenolic resins, these properties combining to develop marked resistance to destructive abrasion even under temperatures as high as say, 700° F. more or less, which cause the breakdown of almost all other friction materials known to the art. At lower temperatures, the durability is increased, and for normal automotive use in a properly designed clutch, these facings will outlast the car.

Again, these treatments may be utilized for the manufacture of brake linings where it is desired to produce a friction material of high durability, low compressibility, and freedom from grabbing tendencies, either of the rigid or flexible type. Materials of these specifications are now considered essential in the newest servo internal four-wheel brakes, and I have found by trial that the products made by my process are excellently adapted for such use.

Unwoven rigid brake linings for internal brakes may be made as follows: Strips of asbestos millboard having approximately the correct developed length and the correct width may be saturated to say 50% increase in weight in a saturant of the following illustrative composition:

| | Parts |
|---|---|
| Phenolic resin | 60 |
| China wood oil | 40 |

They may be allowed to surface dry in an oven at say 175° F. for several hours, and while still warm, are formed against drums of the desired radius, and the strips held in place with suitable straps. They may be next cured in an oven at say 350° F. for six hours and at 400° F. more or less for say 4 hours. The straps may be then removed and while the segments still adhere to the drums a further cure of say 2 hours at 350° F. more or less is administered to develop the frictional qualities of the open surface. After completion of the cure the formed strips are removed from the drums (the adhesion is very slight), and the edges are machined to remove roughness. They are now ready for use.

Woven brake lining may be treated in a similar manner starting with woven asbestos metallic tape to produce a rigid product, or the saturant may be thinned with a suitable solvent to produce semi-rigid or flexible linings. For certain uses it is desirable to decrease the synthetic resin hardener and vary the oil by the use of various gums, waxes, asphalts or tars. For instance, a satisfactory treatment for a flexible woven brake lining may consist of 20 parts resin and 80 parts of water gas tar, the whole cured at 400° F. more or less, in festoons until sufficiently hard.

Another type of satisfactory treatment may consist in

| | Parts |
|---|---|
| Oil soluble phenolic resin | 20 |
| Gilsonite | 80 |
| Benzol | 150 |

With this treatment, the treated lining is merely dried at a low temperature 200° F. more or less, to remove the solvent, and the hardening of the phenolic resin is allowed to take place gradually under heat developed in service. This treatment obviates the necessity of subjecting the brake lining to high temperatures of cure with their attendant inconveniences.

Essentially, this invention relates to methods of utilizing a composite saturant comprising phenolic resin of the ultimately infusible type in combination with an oil, asphalt, gum, tar, or any substance which does not prevent the synthetic resin from becoming infusible, and the products resulting from this composite saturant when combined with and hardened in an incombustible fibrous or cellular base, whether woven or unwoven.

Frictional quality refers to a group of desirable characteristics in friction material comprising primarily uniformity of co-efficient of friction from the beginning to the end of the life of frictional material and a degree of wear combined with the above frictional co-efficient which meets commercial requirements. High co-efficient of friction does not necessarily indicate frictional quality; for instance, the most satisfactory frictional material now in use on modern internal brakes has a lower friction than was previously considered necessary. Frictional quality therefore depends entirely upon the ability of the frictional material to maintain throughout its life a substantially constant co-efficient of friction under the various mechanical conditions of use and abuse.

I claim as my invention:

1. A method of producing elements adapted for frictional purposes, comprising impregnating an incombustible fibrous base with a saturant comprising phenolic resin capable of transformation by heat to an infusible binder and a modifier capable per se of also becoming a binder under the conditions of cure, and thereafter heat treating the saturated incombustible fibrous base to render the saturant infusible and produce an element having satisfactory frictional quality, said modifier being of such a character that the resultant binder is infusible.

2. A method of producing elements adapted for frictional purposes, comprising impregnating an incombustible fibrous base with a saturant comprising phenolic resin capable of transformation by heat to an infustible binder, and a modifier capable per se of also becoming a binder under the conditions of cure, and thereafter heat treating the saturated incombustible fibrous base to render the saturant infusible and produce an element having satisfactory frictional quality, said modifier comprising china wood oil of such character that the resultant binder is infusible.

3. A new article of manufacture adapted for frictional purposes comprising an incombustible fibrous base impregnated with an infusible phenolic resin binder containing a modifying material which per se is also a binder, the latter being of such a type that the resultant binder is infusible and the product has satisfactory frictional quantity, said product being substantially uniform in hardness throughout its thickness.

4. A new article of manufacture adapted for frictional purposes comprising an incombustible fibrous base impregnated with an infusible phenolic resin modified by hardened china wood oil, said product possessing satisfactory frictional quality and being substantially uniform in hardness throughout its thickness.

5. As a new article of manufacture a uniformly hardened structure having frictional quality, comprising an incombustible fibrous base impregnated with a binder comprising infusible phenolic resin and a polymerized china wood oil.

IZADOR J. NOVAK.